US009826547B2

(12) United States Patent
Fujishiro et al.

(10) Patent No.: US 9,826,547 B2
(45) Date of Patent: Nov. 21, 2017

(54) COMMUNICATION CONTROL METHOD, USER TERMINAL, AND BASE STATION (71) Applicant: KYOCERA CORPORATION, Kyoto (JP)

(72) Inventors: Masato Fujishiro, Yokohama (JP); Kugo Morita, Yokohama (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 119 days.

(21) Appl. No.: 14/767,217

(22) PCT Filed: Feb. 18, 2014

(86) PCT No.: PCT/JP2014/053796
§ 371 (c)(1),
(2) Date: Aug. 11, 2015

(87) PCT Pub. No.: WO2014/129465
PCT Pub. Date: Aug. 28, 2014

(65) Prior Publication Data
US 2016/0007372 A1 Jan. 7, 2016

Related U.S. Application Data (60) Provisional application No. 61/766,528, filed on Feb. 19, 2013.

(51) Int. Cl.
*H04W 72/12* (2009.01)
*H04W 8/00* (2009.01)
(Continued)

(52) U.S. Cl.
CPC ....... *H04W 72/1278* (2013.01); *H04W 8/005* (2013.01); *H04W 88/02* (2013.01); *H04W 88/08* (2013.01)

(58) Field of Classification Search
None
See application file for complete search history.

(56) References Cited

U.S. PATENT DOCUMENTS 9,084,241 B2 * 7/2015 Madan ............... H04W 76/023
2012/0115518 A1 5/2012 Zeira et al.
(Continued)

FOREIGN PATENT DOCUMENTS

JP 2005-203850 A 7/2005
WO 2012/060934 A2 5/2012

OTHER PUBLICATIONS

International Search Report for application No. PCT/JP2014/053796 dated May 13, 2014.
(Continued)

*Primary Examiner* — Andrew Lai
*Assistant Examiner* — Jamaal Henson
(74) *Attorney, Agent, or Firm* — Studebaker & Brackett PC (57) ABSTRACT

A communication control method is used in a mobile communication system that supports D2D communication that is direct device-to-device communication in which a data path does not pass through a core network. The communication control method comprises: a step A of transmitting, by a first user terminal camping on a first cell, a radio signal that includes a serving cell identifier for identifying the first cell; a step B of transmitting, by a second user terminal camping on a second cell, the serving cell identifier included in the radio signal from the second user terminal to the second cell when the radio signal is received from the first user terminal; and a step C of sharing, by the first cell and the second cell, scheduling information for controlling the D2D communication performed by the first user terminal and the second user terminal, on the basis of the serving cell (Continued)

identifier received by the second cell from the second user terminal.

15 Claims, 9 Drawing Sheets

(51) Int. Cl.
    *H04W 88/02*     (2009.01)
    *H04W 88/08*     (2009.01)

(56) References Cited

U.S. PATENT DOCUMENTS

2013/0130727 A1*   5/2013   Hakola ................ H04W 68/02
                                                                             455/458
2014/0206322 A1*   7/2014   Dimou ................ H04W 4/005
                                                                             455/414.1

OTHER PUBLICATIONS

3rd Generation Partnership Project; Technical Specification Group Services and System Aspects; Feasibility study for Proximity Services (ProSe) (Release 12), 3GPP TR 22.803 v12.0.0 (Dec. 2012).

* cited by examiner

COMMUNICATION CONTROL METHOD, USER TERMINAL, AND BASE STATION

TECHNICAL FIELD

The present invention relates to a communication control method, a user terminal, and a processor that are used in a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of proximal user terminals (a user terminal group) perform direct communication without passing through a core network. That is, a data path of the D2D communication does not pass through the core network. On the other hand, a data path of normal communication (cellular communication) of a mobile communication system passes through the core network.

PRIOR ART DOCUMENT

Non-Patent Document

[Non Patent Document 1] 3GPP technical report "TR 22.803 V12.0.0" December 2012

SUMMARY OF THE INVENTION

The D2D communication is assumed to be controlled at the initiative of the base station. Thus, when a user terminal group camping on the same cell performs D2D communication, the cell alone controls the D2D communication.

However, when a user terminal camping on a certain cell and a user terminal camping on a cell (a neighbor cell) different from the certain cell perform D2D communication, it is considered that it is necessary for these cells to control the D2D communication in cooperation with one another.

Therefore, the present invention provides a communication control method, a user terminal, and a base station with which a plurality of cells can control D2D communication in cooperation with one another.

A communication control method according to an embodiment is used in a mobile communication system that supports D2D communication that is direct device-to-device communication in which a data path does not pass through a core network. The communication control method comprises: a step A of transmitting, by a first user terminal camping on a first cell, a radio signal that includes a serving cell identifier for identifying the first cell; a step B of transmitting, by a second user terminal camping on a second cell, the serving cell identifier included in the radio signal from the second user terminal to the second cell when the radio signal is received from the first user terminal; and a step C of sharing, by the first cell and the second cell, scheduling information for controlling the D2D communication performed by the first user terminal and the second user terminal, on the basis of the serving cell identifier received by the second cell from the second user terminal.

MODE FOR CARRYING OUT THE INVENTION

Overview of Embodiment

A communication control method according to a first embodiment and a second embodiment is used in a mobile communication system that supports D2D communication that is direct device-to-device communication in which a data path does not pass through a core network. The communication control method includes a step A of transmitting, by a first user terminal camping on a first cell, a radio signal that includes a serving cell identifier for identifying the first cell, a step B of transmitting, by a second user terminal camping on a second cell, the serving cell identifier included in the radio signal from the second user terminal to the second cell when the radio signal is received from the first user terminal, and a step C of sharing, by the first cell and the second cell, scheduling information for controlling the D2D communication performed by the first user terminal and the second user terminal, on the basis of the serving cell identifier received by the second cell from the second user terminal.

In the first embodiment and the second embodiment, the radio signal is a discovery-use signal for discovering a proximal terminal that can be a communication partner of the D2D communication.

In the first embodiment and the second embodiment, the scheduling information includes information on a radio resource that is assigned for the D2D communication performed by the first user terminal and the second user terminal.

In the first embodiment and the second embodiment, the scheduling information includes information on a radio resource that is assigned for the D2D communication in the first cell and/or the second cell.

In the first embodiment and the second embodiment, the radio resource is a radio resource capable of being used for receiving a D2D communication signal in the D2D communication.

In the first embodiment and the second embodiment, the radio resource is a radio resource capable of being used for transmitting a D2D communication signal in the D2D communication.

In the first embodiment and the second embodiment, the radio resource capable of being used for transmitting a D2D communication signal in the D2D communication, is within a range of a radio resource capable of being used for receiving the D2D communication signal, in the first cell and/or the second cell.

In other embodiment, the radio resource assigned for the D2D communication is a radio resource capable of being used for exchanging a control signal including information indicating a radio resource used for exchanging user data in the D2D communication.

In the first embodiment and the second embodiment, the communication control method further includes a step D of controlling, by the first cell and the second cell in cooperation with each other, the D2D communication performed by the first user terminal and the second user terminal, on the basis of the shared scheduling information.

In the second embodiment, one user terminal of the first user terminal and the second user terminal is an anchor terminal capable of controlling the other user terminal in the D2D communication. In the step D, the first cell or the second cell transmits control information of the D2D communication to the one user terminal serving as the anchor terminal.

In the second embodiment, the step D includes a step of inquiring, by the one user terminal serving as the anchor terminal, of a serving cell of the one user terminal of the first cell and the second cell about whether it is possible to apply the scheduling information decided in the one user terminal, and a step of sharing, by the first cell and the second cell, the scheduling information on the basis of the inquiry from the one user terminal serving as the anchor terminal.

In the first embodiment and the second embodiment, the first cell is managed by a first base station and the second cell is managed by a second base station, and in the step C, one of the first base station and the second base station transmits the scheduling information to the other base station to thereby share the scheduling information between the first cell and the second cell.

A user terminal according to the first embodiment and the second embodiment camps on a first cell in a mobile communication system that supports D2D communication that is direct device-to-device communication in which a data path does not pass through a core network. The user terminal includes a transmission unit that transmits a discovery-use signal that is a signal for discovering a proximal terminal that can be a communication partner of the D2D communication and includes a serving cell identifier for identifying the first cell.

A user terminal according to the first embodiment and the second embodiment camps on a second cell in a mobile communication system that supports D2D communication that is direct device-to-device communication in which a data path does not pass through a core network. The user terminal includes a reception unit that receives, from another user terminal camping on a first cell, a discovery-use signal that is a signal for discovering a proximal terminal to be a communication partner of the D2D communication and includes a serving cell identifier for identifying the first cell, and a transmission unit that transmits, to the second cell, the serving cell identifier included in the discovery-use signal received by the reception unit.

A base station according to the first embodiment and the second embodiment manages a second cell in a mobile communication system that supports D2D communication that is direct device-to-device communication in which a data path does not pass through a core network. The base station includes a reception unit that receives a serving cell identifier for identifying a first cell on which a first user terminal camps from a second user terminal camping on the second cell, and a control unit that shares scheduling information for controlling the D2D communication performed by the first user terminal and the second user terminal with another base station that manages the first cell, on the basis of the serving cell identifier received by the reception unit.

First Embodiment

Hereinafter, with reference to the accompanying drawings, description will be provided for an embodiment in a case where D2D communication is introduced to a mobile communication system (an LTE system) configured based on the 3GPP standards.

LTE System

Figure 1:
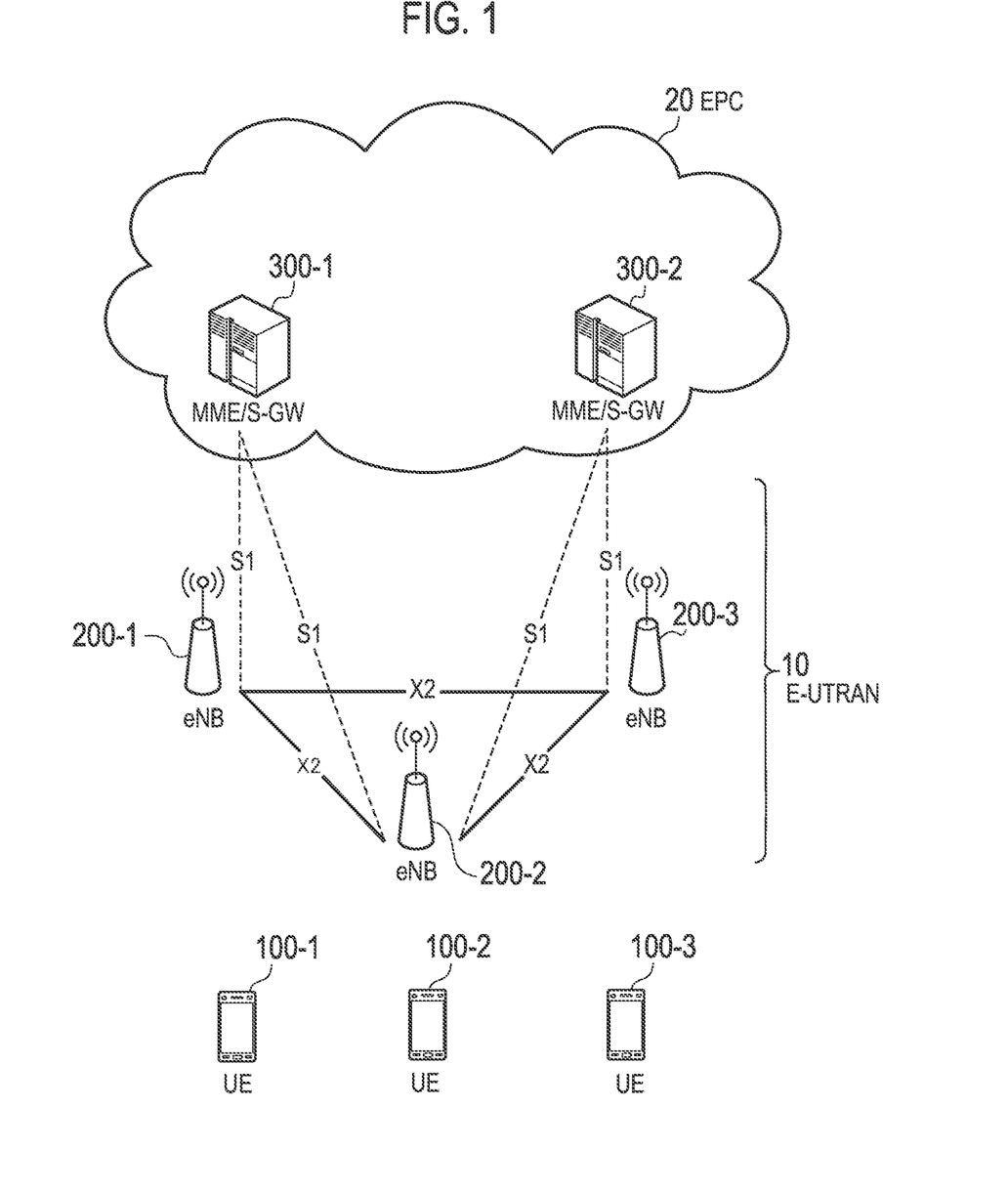
FIG. 1 is a configuration diagram of an LTE system according to a first embodiment to a third embodiment.

FIG. 1 is a configuration diagram of an LTE system according to the first embodiment. As illustrated in FIG. 1, the LTE system includes a plurality of UEs (User Equipments) 100, E-UTRAN (Evolved-Universal Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 100 is a mobile communication device and performs radio communication with a cell (a serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes a plurality of MME (Mobility Management Entity)/S-GWs (Serving-Gateways) 300. The MME is a network node for performing various mobility controls and the like for the UE 100 and corresponds to a controller. The S-GW is a network node that performs control to transfer user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
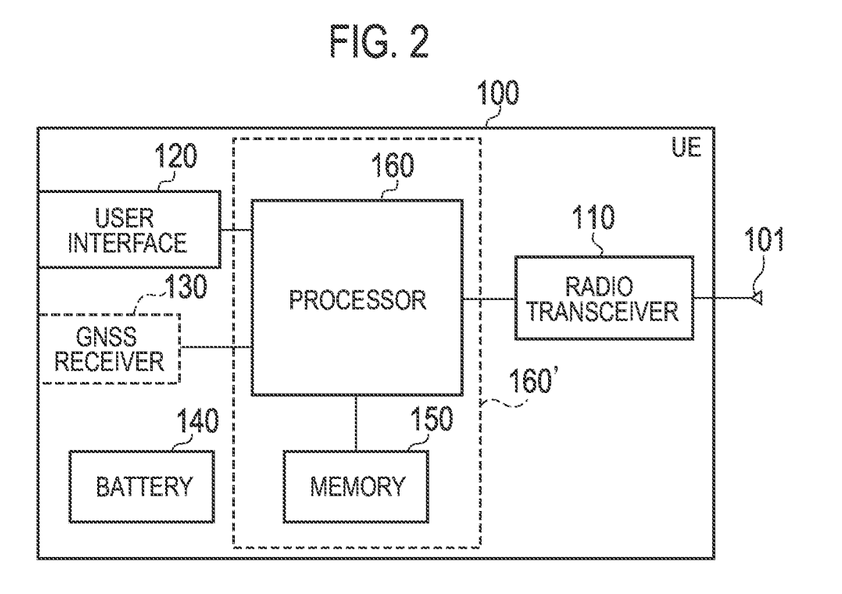
FIG. 2 is a block diagram of UE according to the first embodiment to the third embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a control unit. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
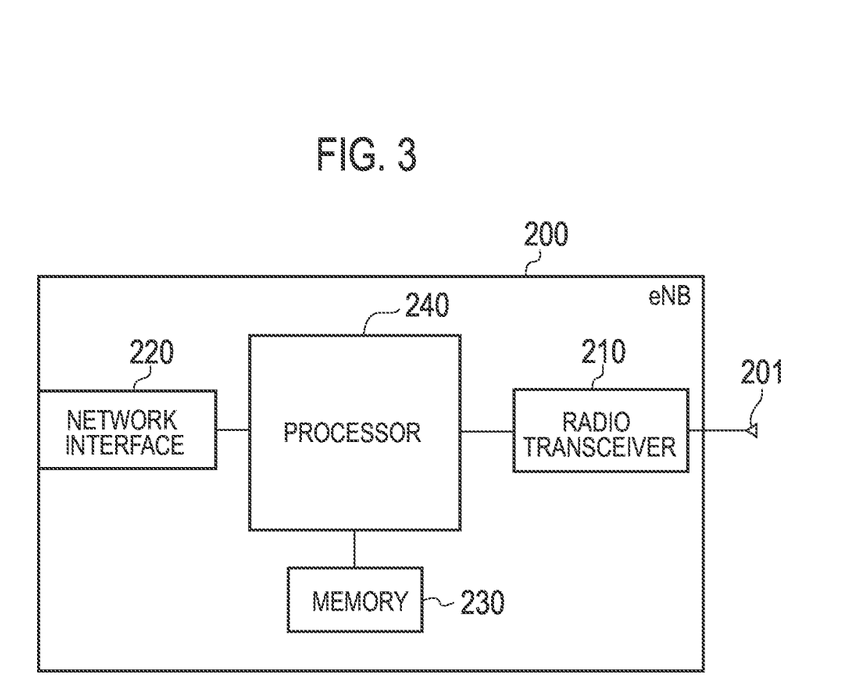
FIG. 3 is a block diagram of eNB according to the first embodiment to the third embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Furthermore, the memory 230 may be integrally formed with the processor 240, and this set (that is, a chip set) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
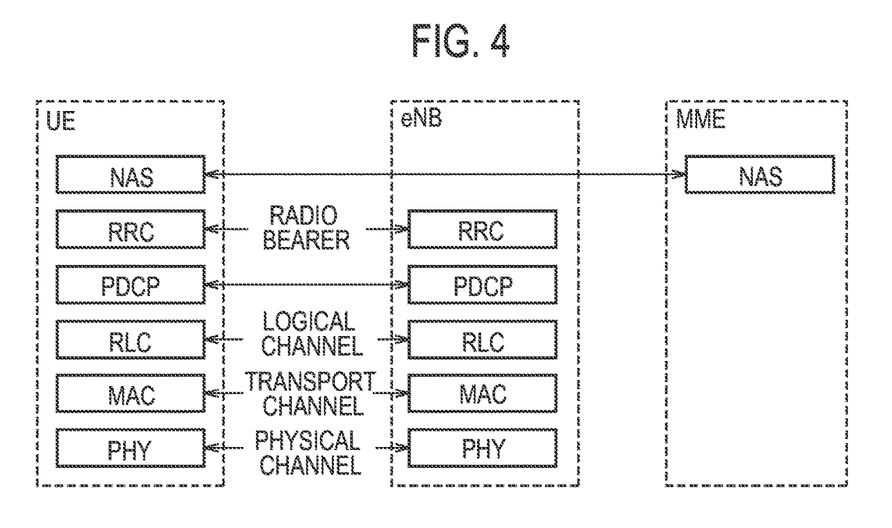
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
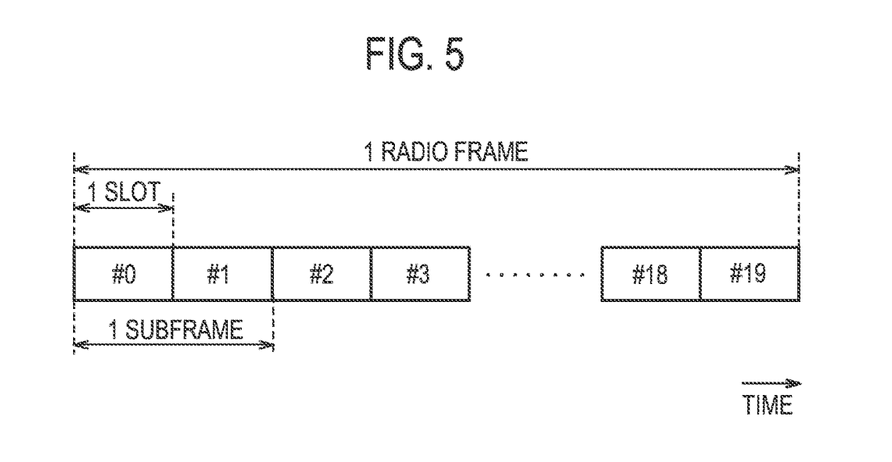
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned for the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Further, the central portion in the frequency direction of each subframe is a region mainly capable of being used as a physical uplink shared channel (PUSCH) for transmitting user data.

D2D Communication

The LTE system according to the first embodiment supports D2D communication that is direct communication between UEs. Hereinafter, the D2D communication will be described in comparison with normal communication (cellular communication) of the LTE system.

In the cellular communication, a data path passes through the EPC 20 that is a core network. The data path indicates a communication path of user data (a user plane). On the other hand, in the D2D communication, the data path set between the UEs does not pass through the EPC 20. Thus, it is possible to reduce traffic load of the EPC 20.

The UE 100 discovers another UE 100 that exists in the vicinity of the UE 100, and starts the D2D communication. The D2D communication includes a direct communication mode and a locally routed mode.

Figure 6:
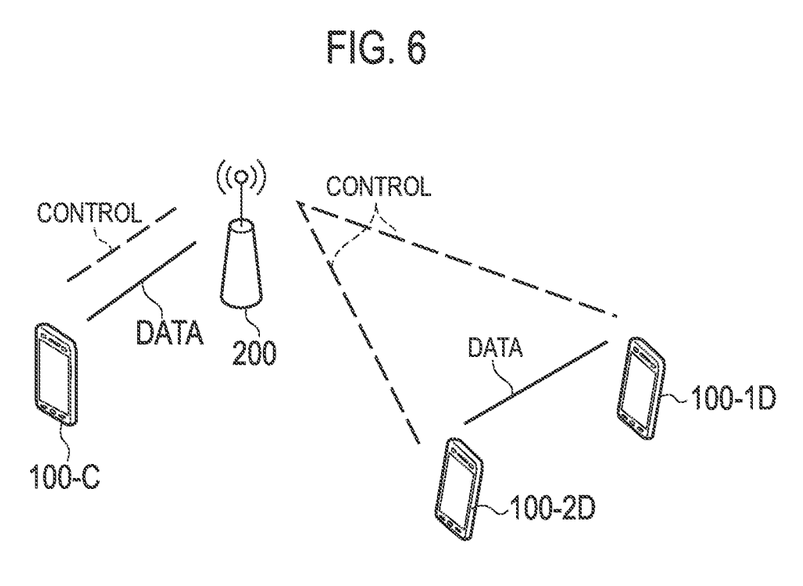
FIG. 6 is a diagram for explaining a direct communication mode in D2D communication.

FIG. 6 is a diagram for describing the direct communication mode in the D2D communication. As illustrated in FIG. 6, in the direct communication mode, a data path does not pass through the eNB 200. UE 100-1D and UE 100-2D adjacent to each other directly perform radio communication with low transmission power in a cell of the eNB 200. Thus, a merit including reduction of power consumption of the UE 100 and decrease of interference to a neighbor cell can be obtained.

The UE 100-1D and the UE 100-2D are D2D UEs (D2D terminals) that perform the D2D communication of the direct communication mode in the cell of the eNB 200. The UE 100-1D and the UE 100-2D in a connected state perform the D2D communication by using a radio resource that is assigned from the eNB 200. The UE 100-1D and the UE 100-2D transmit and receive user data with each other, and transmit and receive a control signal with the eNB 200. As described above, the control of the D2D communication is performed at the initiative of the eNB 200.

Any one UE of the UE 100-1D and the UE 100-2D may be an anchor UE (an anchor terminal) capable of controlling the other UE in the D2D communication. The anchor UE may have a decision right of a radio resource that is used in the D2D communication, or may be able to transmit a control signal to the other UE (a communication partner UE). When the anchor UE exists, the other UE (the communication partner UE) may transmit and receive the control signal with the anchor UE without exchanging the control signal with the eNB 200.

In the first embodiment, description will be provided for an operation when the anchor UE does not exist. An operation when the anchor UE exists will be described in the second embodiment.

UE 100-C is a cellular UE (a cellular terminal) that performs cellular communication in the cell of the eNB 200. The UE 100-C in a connected state performs the cellular communication by using the radio resource that is assigned from the eNB 200. The UE 100-C transmits and receives user data and a control signal with the eNB 200.

In addition, in the locally routed mode, a data path between UEs passes through the eNB 200, however, the data path does not pass through the EPC 20. That is, in the locally routed mode, the UE 100-1D and the UE 100-2D perform radio communication via the eNB 200 without any intervention of the EPC 20. The locally routed mode is able to reduce traffic load of the EPC 20, however, has small merit as compared with the direct communication mode. Thus, in the first embodiment, the direct communication mode is mainly assumed.

Operation According to First Embodiment

Next, an operation according to the first embodiment is described in sequence of (1) an operation overview and (2) an operation sequence.

(1) Operation Overview

Figure 7:
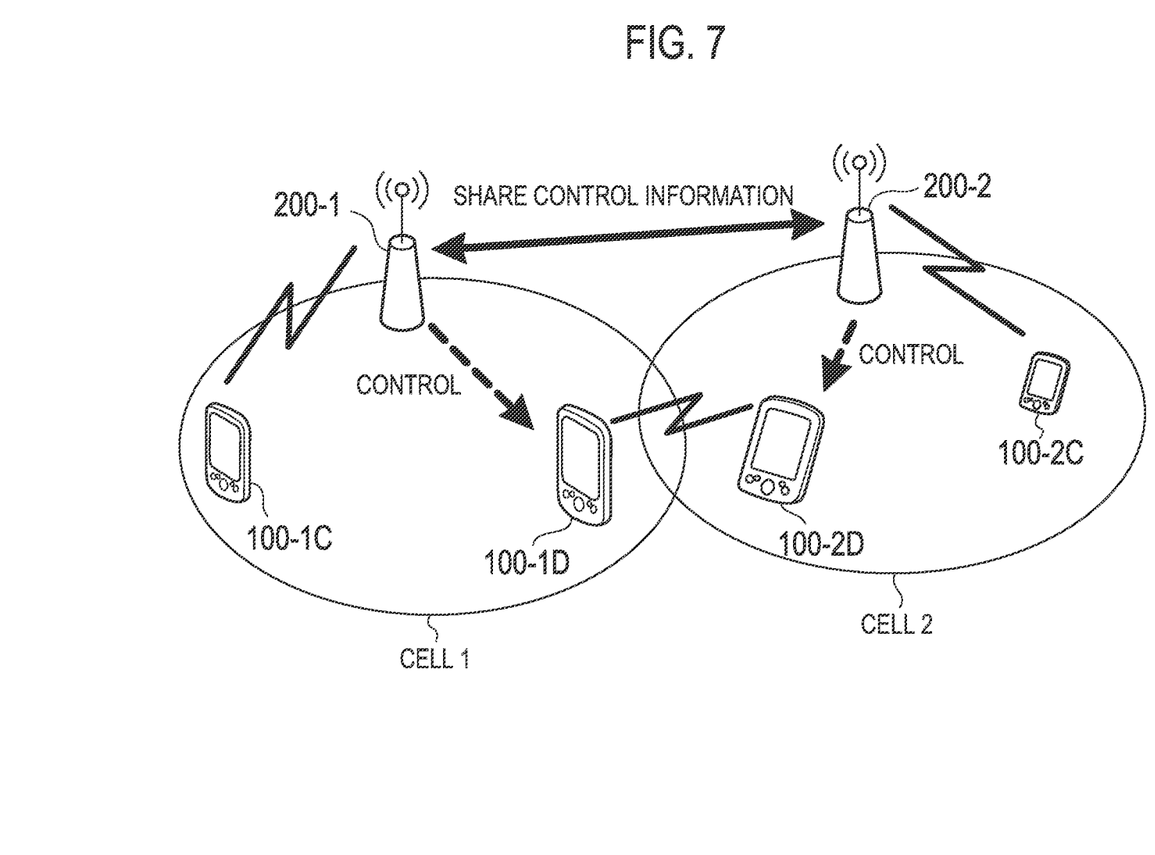
FIG. 7 is a diagram for explaining a locally routed mode in the D2D communication.

FIG. 7 is a diagram for describing an operation environment according to the first embodiment. As shown in FIG. 7, eNB 200-1 manages a cell 1 (a first cell). On the cell 1, UE 100-1C and UE 100-1D camp. That is, the cell 1 is a serving cell of each of the UE 100-1C and the UE 100-1D. Each of the UE 100-1C and the UE 100-1D is in a connected state in the cell 1. The UE 100-1C performs cellular communication.

eNB 200-2 manages a cell 2 (a second cell) adjacent to the cell 1. On the cell 2, UE 100-2C and UE 100-2D camp. That is, the cell 2 is a serving cell of each of the UE 100-2C and the UE 100-2D. Each of the UE 100-2C and the UE 100-2D is in a connected state in the cell 2. The UE 100-2C performs cellular communication.

In the first embodiment, description will be mainly provided for an operation for performing D2D communication by the UE 100-1D camping on the cell 1 and the UE 100-2D camping on the cell 2. Hereinafter, an operation overview according to the first embodiment will be described.

As a first process, the UE 100-1D transmits a signal (a Discovery signal) for discovering a proximal UE (a proximal terminal) that can be a communication partner of the D2D communication. The UE 100-1D may periodically transmit the discovery-use signal. In the first embodiment, the discovery-use signal includes a serving cell identifier for identifying a serving cell of transmission source UE of the discovery-use signal. That is, the UE 100-1D includes, in the discovery-use signal, a cell identifier of the cell 1 that is a serving cell of the UE 100-1D as the serving cell identifier. Furthermore, the UE 100-1D may include, in the discovery-use signal, a transmission source identifier and/or a transmission destination identifier.

As a second process, the UE 100-2D camping on the cell 2 receives the discovery-use signal from the UE 100-1D. On the basis of the serving cell identifier included in the received discovery-use signal, the UE 100-2D recognizes that the transmission source UE (the UE 100-1D) of the discovery-use signal camps on the cell 1. Then, the UE 100-2D transmits the serving cell identifier included in the discovery-use signal to the cell 2.

When the UE 100-2D transmits a Discovery reception report for reporting the reception of the discovery-use signal to the cell 2, the UE 100-2D may include, in the Discovery reception report, the serving cell identifier included in the discovery-use signal.

Alternatively, when the UE 100-2D transmits, to the cell 2, a D2D start request for requesting the start of the D2D communication, the UE 100-2D may include, in the D2D start request, the serving cell identifier included in the discovery-use signal.

Alternatively, the UE 100-2D may include, in a resource assignment request (a scheduling request), the serving cell identifier included in the discovery-use signal. In this case, the UE 100-2D simply requests the cell 2 to assign a resource (a transmission request of an uplink) without distinguishing D2D communication from cellular communication, and the cell 2 (or the EPC 20) determines which to be applied, the D2D communication or the cellular communication. In addition, when the UE 100-2D transmits the resource assignment request (the scheduling request), negotiation, which will be described later, may be omitted.

As a third process, on the basis of the serving cell identifier received from the UE 100-2D, the cell 2 (the eNB 200-2) recognizes that the UE 100-1D, which is a proximal UE that can be a communication partner of the UE 100-2D, camps on the cell 1. Then, the cell 1 (the eNB 200-1) and the cell 2 (the eNB 200-2) perform negotiation, and share scheduling information for controlling the D2D communication that is performed by the UE 100-1D and the UE 100-2D. The scheduling information includes information on a radio resource that is assigned for the D2D communication that is performed by the UE 100-1D and the UE 100-2D. Here, the radio resource assigned for the D2D communication performed by the UE 100-1D and the UE 100-2D may be a radio resource (actually) assigned for the D2D communication performed by the UE 100-1D and the UE 100-2D, and a radio resource planned to be assigned for the D2D communication performed by the UE 100-1D and the UE 100-2D (that is, a prescheduled radio resource). Alternatively, the radio resource assigned for the D2D communication may be a radio resource assigned for the D2D communication in the cell 1 and/or the cell 2.

As a fourth process, on the basis of the shared scheduling information, the cell 1 (the eNB 200-1) and the cell 2 (the eNB 200-2) control, in cooperation with each other, the D2D communication performed by the UE 100-1D and the UE 100-2D. For example, in the case that the UE 100-1D transmits the D2D communication signal, because the UE 100-1D cannot receive D2D communication signal from the UE 100-2D, the cell 1 and the cell 2 control, in cooperation with each other, the timing of the transmission of the D2D communication signal.

The aforementioned first process and second process are included in a discovery process (Discovery Process) for starting the D2D communication. The third process and the fourth process are included in a D2D communication process (Communication Process).

By such a procedure, even though the UE 100-1D camping on the cell 1 and the UE 100-2D camping on the cell 2 perform the D2D communication, the cell 1 and the cell 2 can control the D2D communication in cooperation with each other.

(2) Operation Sequence

Figure 8:
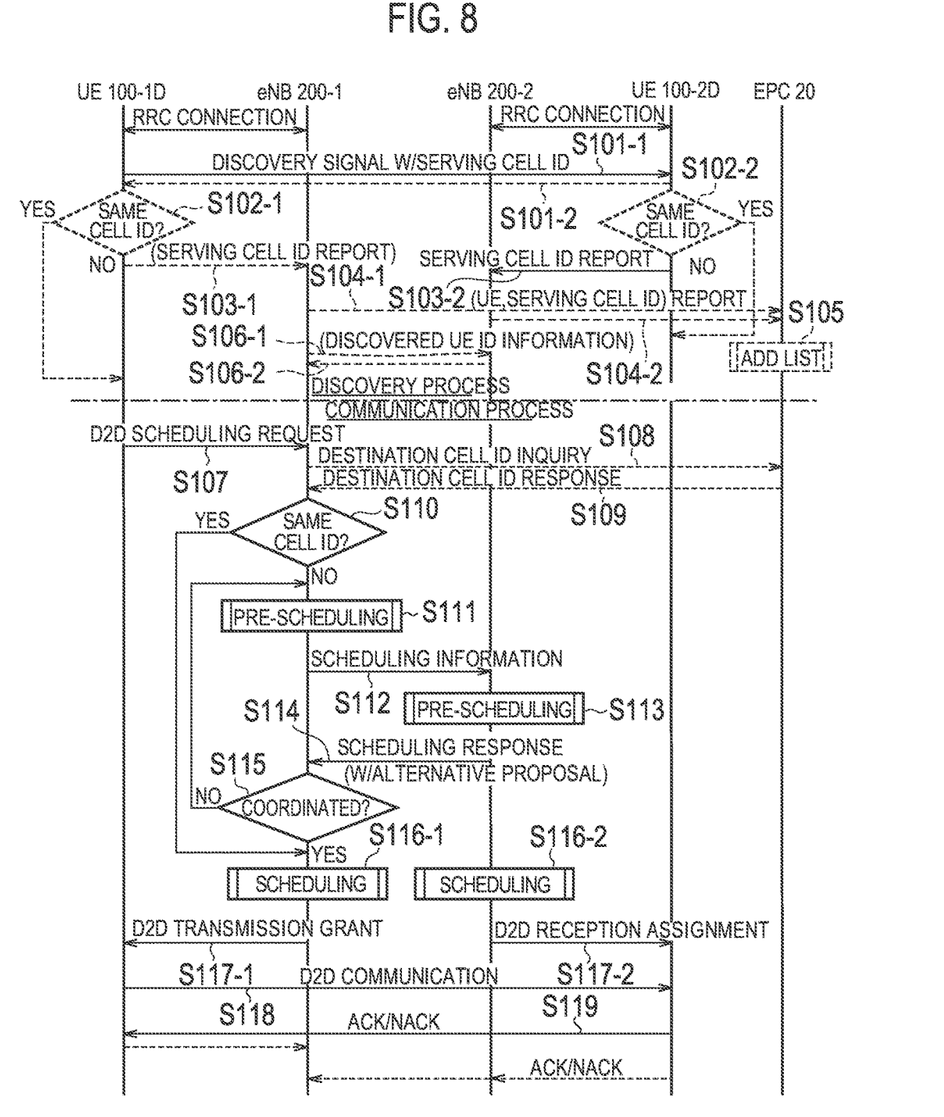
FIG. 8 is a sequence diagram illustrating a specific example of a control procedure according to the first embodiment.

Hereinafter, a specific example of a control procedure according to the first embodiment is described. FIG. 8 is a sequence diagram illustrating a specific example of a control procedure according to the first embodiment. Processes indicated by broken lines in FIG. 8 are not essential. Furthermore, the UE 100-1D is a transmission side in the D2D communication and the UE 100-2D is a reception side in the D2D communication.

As shown in FIG. 8, in an initial state of the present sequence, each of the UE 100-1D and the UE 100-2D is in a connected state.

The UE 100-1D transmits a discovery-use signal including a serving cell identifier (a cell identifier of the cell 1) (S101-1). The UE 100-2D which receives the discovery-use signal determines whether a cell identifier of the cell 2, which is a serving cell of the UE 100-2D, coincides with the serving cell identifier included in the discovery-use signal (S102-2). When these identifiers do not coincide with each other, the UE 100-2D transmits the serving cell identifier included in the discovery-use signal to the cell 2 (S103-2). In addition, the UE 100-2D may transmit a transmission source identifier (a UE identifier of the UE 100-1D) included in the discovery-use signal to the cell 2.

In the same manner, the UE 100-2D transmits a discovery-use signal including a serving cell identifier (a cell identifier of the cell 2) (S101-2). The UE 100-1D which receives the discovery-use signal determines whether the cell identifier of the cell 1, which is a serving cell of the UE 100-1D, coincides with the serving cell identifier included in the discovery-use signal (S102-1). When these identifiers do not coincide with each other, the UE 100-1D transmits the serving cell identifier included in the discovery-use signal to the cell 1 (S103-1). In addition, the UE 100-1D may transmit a transmission source identifier (a UE identifier of the UE 100-2D) included in the discovery-use signal to the cell 1.

Furthermore, the cell 1 reports, to the EPC 20, the serving cell identifier received from the UE 100-1D (S104-1). The cell 2 reports, to the EPC 20, the serving cell identifier received from the UE 100-2D (S104-2). The EPC 20 registers each of the reported serving cell identifiers (S105).

Moreover, on the basis of the serving cell identifier (the cell identifier of the cell 2) and the transmission source identifier (the UE identifier of the UE 100-2D) received from the UE 100-1D, the cell 1 notifies the cell 2 of information indicating that the UE 100-2D is discovered (S106-1). On the basis of the serving cell identifier (the cell identifier of the cell 1) and the transmission source identifier (the UE identifier of the UE 100-1D) received from the UE 100-2D, the cell 2 notifies the cell 1 of information indicating that the UE 100-1D is discovered (S106-2).

Then, the UE 100-1D transmits, to the cell 1, a resource assignment request for D2D communication (S107). The resource assignment request may include a communication partner identifier (the UE identifier of the UE 100-2D) of the UE 100-1D.

The cell 1 which receives the resource assignment request from the UE 100-1D inquires of the EPC 20 about a cell identifier of a cell on which the communication partner (the UE 100-2D) of the UE 100-1D camps (S108). In response to the inquiry, the EPC 20 notifies the cell 1 of the cell identifier (the cell identifier of the cell 2) of the cell on which the communication partner (the UE 100-2D) of the UE 100-1D camps (S109).

The cell 1 determines whether the cell identifier of the cell 1 coincides with the cell identifier (the cell identifier of the cell 2) of the cell on which the communication partner (the UE 100-2D) of the UE 100-1D camps (S110). In addition, in the case of "Yes" in step S102-1 or when the process of S106-1 is performed, the determination of S110 may be omitted. When these cell identifiers do not coincide with each other, the cell 1 makes a provisional decision (that is, performs pre-scheduling) for a radio resource, for example, that is assigned for D2D communication that is performed by the UE 100-1D and the UE 100-2D (S111). Then, the cell 1 notifies the cell 2 of scheduling information including information indicating a result of the pre-scheduling (S112).

The cell 2 which receives the scheduling information from the cell 1 determines whether to grant the scheduling information (S113). Then, the cell 2 notifies the cell 1 of a determination result (S114). In this case, when the cell 2 denies the scheduling information from the cell 1, the cell 2 may transmit, to the cell 1, scheduling information indicating a result obtained by performing pre-scheduling by the cell 2.

The cell 1 determines whether the scheduling information has been granted in the cell 2 (S115). When the scheduling information is received from the cell 2, the cell 1 may determine whether to grant the scheduling information.

Hereinafter, description will be given on the assumption that the scheduling information has been granted in the cell 2. As a result, the scheduling information is shared by the cell 1 and the cell 2.

The cell 1 performs scheduling according to the shared scheduling information (S116-1). The scheduling may be performed only for D2D communication, or performed for both D2D communication and cellular of cellular communication. The cell 2 performs scheduling according to the shared scheduling information (S116-2).

Then, the cell 1 transmits, to the UE 100-1D, control information indicating transmission grant and an assigned radio resource in the D2D communication (S117-1). The assigned radio resource herein is radio resource used for transmitting a D2D communication signal. The cell 2 transmits, to the UE 100-2D, control information indicating reception grant and an assigned radio resource in the D2D communication (S117-2). The assigned radio resource herein is radio resource used for receiving a D2D communication signal. The radio resource used for transmitting a D2D communication signal may be the same assigned radio resource that transmitted from the cell 1 to the UE 100-1D, or may be the radio resource (reception pool) capable of being used for receiving the D2D communication, in the cell 1 and/or the cell 2

The UE 100-1D transmits data to the UE 100-1D according to the control information received from the cell 1 (S118). The UE 100-2D receives data from the UE 100-1D according to the control information received from the cell 2, and decodes the data. Then, the UE 100-2D transmits ACK/NACK indicating success or failure of the data decoding to the UE 100-1D (S119). The ACK/NACK may be notified to the UE 100-1D via the cell 2 and the cell 1.

(3) Message Configuration Example

The scheduling information shown in S112 (and S114) of FIG. 8, for example, is transmitted and received on the X2 interface. In this case, the scheduling information (D2D scheduling indication) may be information elements of a Load Information message defined in 3GPP technical specification "TS 36.423" as shown in Table 1.

TABLE 1

| IE/Group Name | Presence |
|---|---|
| Message Type | M |
| Cell Information | M |
| >Cell Information Item | |
| >>Cell ID | M |
| >>UL Interference Overload Indication | O |
| >>UL High Interference Information | |
| >>>Target Cell ID | M |
| >>>UL High Interference Indication | M |
| >>Relative Narrowband Tx Power (RNTP) | O |
| >>ABS Information | O |
| >>Invoke Indication | O |
| >> D2D scheduling indication | O |

Furthermore, as shown in Table 2, the scheduling information (D2D scheduling indication) may include resource information indicating a frequency resource (a resource block) that is assigned for the D2D communication, and an identifier of UE subject to assignment. In the example shown in Table 2, the resource information includes a bit string in which a resource block assigned for the D2D communication has a value of "1" and an unassigned resource block has a value of "0".

TABLE 2

| IE/Group Name | Presence | Range | IE type and reference | Semantics description |
|---|---|---|---|---|
| D2D-Indication | M | | BIT STRING (1 ... 110, ...) | Each position in the bitmap represents a PRB (first bit = PRB 0 and so on), for which value "1" indicates 'assigned for D2D' and value "0" indicates 'not assigned for D2D'. The maximum number of Physical Resource Blocks is 110 |
| UE ID | M | | INTEGER | |

The scheduling information may include information indicating a time resource (a subframe) that is assigned for the D2D communication. Furthermore, the scheduling information may also include information indicating a modulation and coding scheme (MCS) of the D2D communication. Moreover, the scheduling information may also include an identifier for identifying transmission and reception in the D2D communication.

It is noted that the scheduling information may include a radio resource assigned for the D2D communication, as described above. Here, the radio resource assigned for the D2D communication is a radio resource (reception pool; hereinafter, D2D transmission radio resource) capable of being used for receiving the D2D communication signal in the D2D communication and/or a radio resource capable of being used for transmitting the D2D communication signal (hereinafter, D2D reception radio resource). The D2D transmission radio resource is within a range of the D2D reception radio resource.

The information on the radio resource assigned for the D2D communication is information indicating a subframe that can be assigned for the D2D communication, and information indicating an arrangement pattern of a subframe that can be assigned for the D2D communication, out of continuous subframes (for example, 40 subframes), for example. Of course, the information on the radio resource assigned for the D2D communication includes resource information indicating a frequency resource assigned for the above-described D2D communication (resource block) and information indicating a time resource (subframe) assigned for the D2D communication.

In addition, in the case in which a code division multiplexing scheme is applied to the D2D communication, the scheduling information may also include information indicating a spread code as a radio resource that is assigned for the D2D communication.

Second Embodiment

Hereinafter, a second embodiment will be described on a difference from the first embodiment. In the second embodiment, description will be provided for an operation when anchor UE exists. When the anchor UE exists, a D2D communication process (Communication Process) differs from that of the first embodiment.

Hereinafter, specific examples (operation patterns 1 to 3) of the D2D communication process according to the second embodiment are described. In the second embodiment, the UE 100-1D is the anchor UE.

(1) Operation Pattern 1

Figure 9:
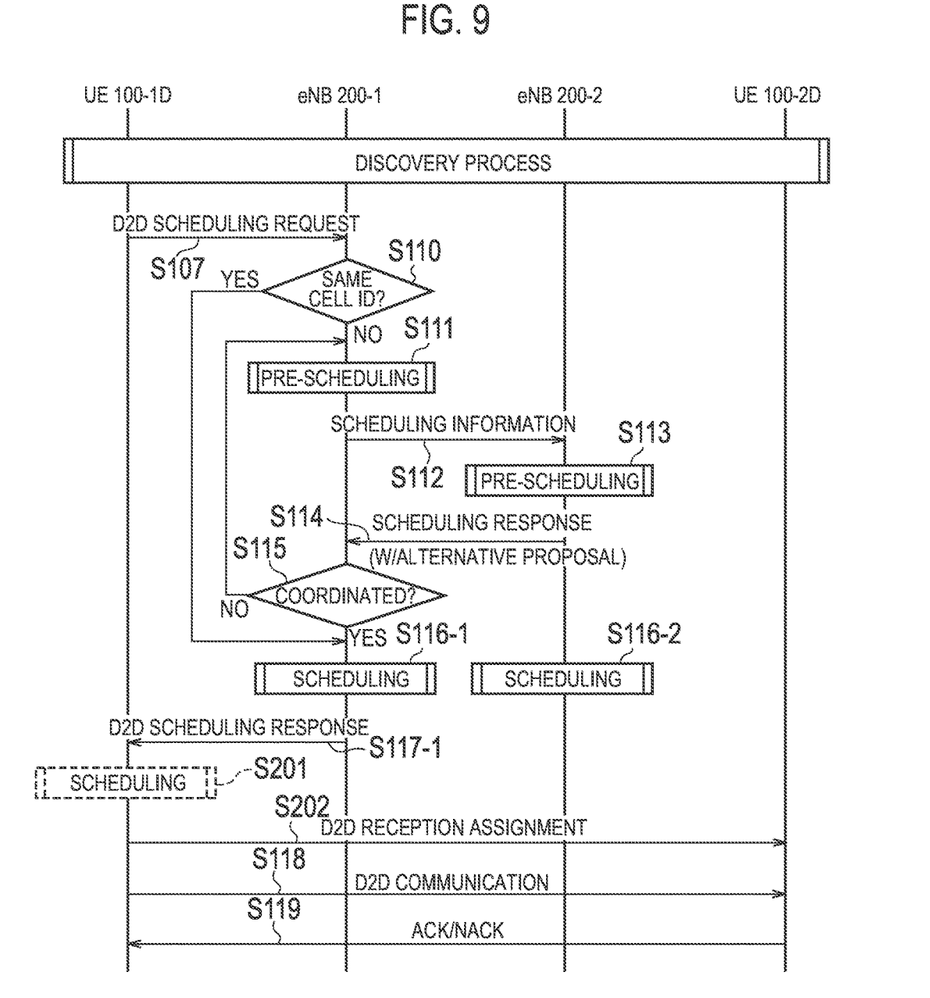
FIG. 9 is a sequence diagram illustrating an operation pattern 1 of a D2D communication process according to the second embodiment.

FIG. 9 is a sequence diagram illustrating an operation pattern 1 of a D2D communication process according to the second embodiment. A process indicated by broken lines in FIG. 9 is not essential.

As shown in FIG. 9, a procedure (S107 to S116) from transmitting a resource assignment request by the UE 100-1D to deciding a radio resource to be assigned for D2D communication is the same as that of the first embodiment.

In the present operation pattern 1, the cell 1 transmits, to the UE 100-1D, control information indicating transmission grant and assignable radio resources in the D2D communication (S117-1). The assignable radio resources mean assigned resource blocks in units of subframes, assigned resource blocks to which semi-persistent scheduling is applied, or radio resources dedicated for the D2D communication. Meanwhile, the cell 2 transmits no control information to the UE 100-2D.

The UE 100-1D which receives the control information from the cell 1 decides a radio resource to be used in the D2D communication with the UE 100-2D from the assignable radio resources (S201). Furthermore, the UE 100-1D transmits, to the UE 100-2D, control information indicating reception grant and assigned radio resources in the D2D communication (S202).

The UE 100-1D transmits data to the UE 100-2D by using the decided radio resource (S118). The UE 100-2D receives data from the UE 100-1D by using the assigned radio resources, and then decodes the data. Then, the UE 100-2D transmits ACK/NACK indicating success or failure of the data decoding to the UE 100-1D (S119).

(2) Operation Pattern 2

Figure 10:
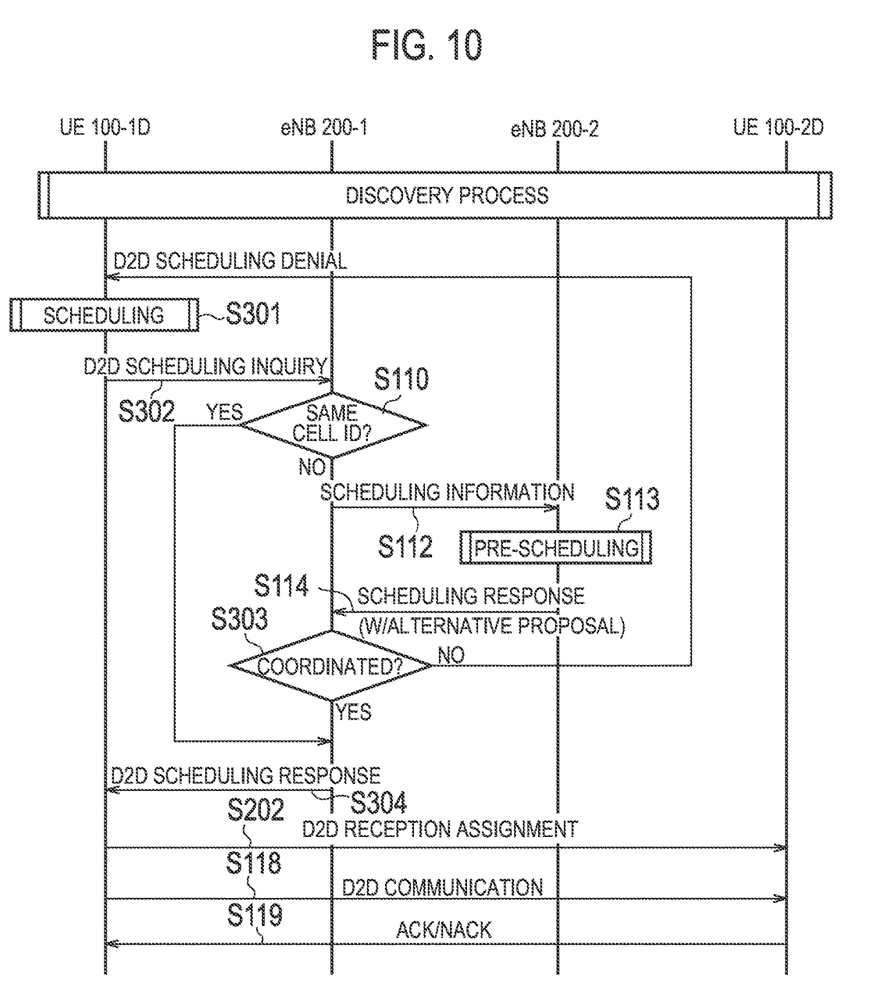
FIG. 10 is a sequence diagram illustrating an operation pattern 2 of the D2D communication process according to the second embodiment.

FIG. 10 is a sequence diagram illustrating an operation pattern 2 of the D2D communication process according to the second embodiment.

As shown in FIG. 10, the UE 100-1D performs scheduling for a radio resource and so on which are desired to be assigned for D2D communication (S301). Furthermore, the UE 100-1D inquires of the cell 1 about whether scheduling information decided by the UE100-1D is applicable (S302).

The cell 1 determines whether the cell identifier of the cell 1 coincides with the cell identifier (the cell identifier of the cell 2) of the cell on which the communication partner (the UE 100-2D) of the UE 100-1D camps (S110). When these identifiers do not coincide with each other, the cell 1 notifies the cell 2 of the scheduling information decided by the UE 100-1D (S112).

The cell 2 which receives the scheduling information from the cell 1 determines whether to grant the scheduling information (S113). Then, the cell 2 notifies the cell 1 of a determination result (S114). In this case, when the cell 2 denies the scheduling information from the cell 1, the cell 2 may transmit, to the cell 1, scheduling information indicating a result obtained by performing pre-scheduling by the cell 2.

The cell 1 determines whether the scheduling information has been granted in the cell 2 (S303). When the scheduling information is received from the cell 2, the cell 1 may determine whether to grant the scheduling information from the cell 2.

When the scheduling information has been denied in the cell 2 (and when the scheduling information from the cell 2 is denied), the cell 1 notifies the UE 100-1D of assignment denial. Hereinafter, description will be given on the assumption that the scheduling information has been granted in the cell 2.

The cell 1 transmits, to the UE 100-1D, control information indicating assignment grant (transmission grant) in the D2D communication (S304). Alternatively, the cell 1 may transmit, to the UE 100-1D, control information corresponding to the scheduling information from the cell 2. Meanwhile, the cell 2 transmits no control information to the UE 100-2D.

The UE 100-1D which receives the control information from the cell 1 transmits, to the UE 100-2D, control information indicating reception grant and an assigned radio resource in the D2D communication (S202).

Then, the UE 100-1D transmits data to the UE 100-2D (S118). The UE 100-2D receives data from the UE 100-1D, and then decodes the data. Then, the UE 100-2D transmits ACK/NACK indicating successor failure of the data decoding to the UE 100-1D (S119).

(3) Operation Pattern 3

Figure 11:
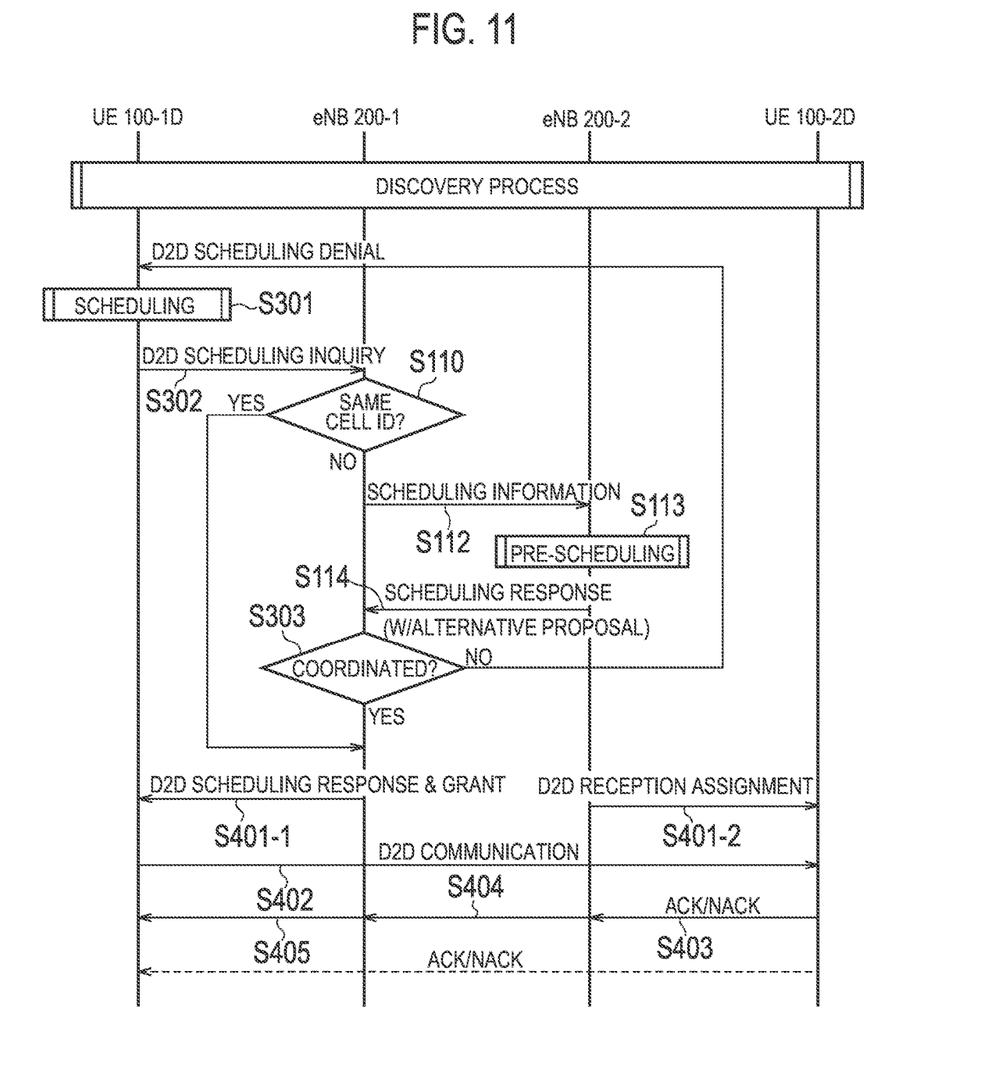
FIG. 11 is a sequence diagram illustrating an operation pattern 3 of the D2D communication process according to the second embodiment.

FIG. 11 is a sequence diagram illustrating an operation pattern 3 of the D2D communication process according to the second embodiment. A process indicated by broken lines in FIG. 11 is not essential.

As shown in FIG. 11, the present operation pattern 3 is obtained by modifying a part of the aforementioned operation pattern 2. In the aforementioned operation pattern 2, the control information is transmitted from the UE 100-1D to the UE 100-2D. However, in the present operation pattern 3, the control information is transmitted from the cell 2 to the UE 100-2D (S401-2).

Then, the UE 100-1D transmits data to the UE 100-2D (S402). The UE 100-2D receives data from the UE 100-1D, and then decodes the data. Then, the UE 100-2D notifies ACK/NACK indicating successor failure of the data decoding to the UE 100-1D via the cell 2 and the cell 1 (S403 to S405). However, the ACK/NACK may be directly notified from the UE 100-2D to the UE 100-1D.

Other Embodiments

In each of the aforementioned embodiments, a radio resource (a D2D radio resource) ensured to be assigned for the D2D communication has not particularly mentioned in each of the cell 1 and the cell 2. However, information on the D2D radio resource is shared between cells, so that it is possible to improve the efficiency of the aforementioned inter-cell cooperation scheduling. For example, when each of the cell 1 and the cell 2 changes a D2D radio resource of its own cell, each of the cell 1 and the cell 2 may notify the other cell of information on the change.

In each of the above-described embodiments, the radio signal including the serving cell identifier is the discovery-use signal; however, this is not limiting. For example, the radio signal including the serving cell identifier is a radio signal associated with the D2D communication. Specifically, the radio signal including the serving cell identifier is a D2D synchronization signal transmitted in the D2D synchronization procedure in which synchronization is established among the UEs for the D2D communication. Alternatively, the radio signal including the serving cell identifier may be a control signal including information (SA: Scheduling Assignment) indicating a radio resource used for exchanging the user data in the D2D communication.

Further, in each of the above-described embodiments, the radio resource assigned for the D2D communication is the radio resource used for transmitting the D2D communication signal; however, this is not limiting. The radio resource assigned for the D2D communication may be a radio resource (transmission pool/reception pool) capable of being used for exchanging the control signal including the above-described SA. It is noted that the radio resource capable of being used for exchanging the control signal including the SA may be a radio resource (actually) assigned to the UE 100-1D and the UE 100-2D (or a prescheduled radio resource).

For example, in step S117-1 in the above-described first embodiment, the cell 1 (eNB 200-1) may transmit, as the assigned radio resource, a first radio resource (transmission pool) used for transmitting the D2D communication signal indicating the user data and a second radio resource capable of being used for exchanging the control signal including the SA. In this case, the UE 100-1D determines (schedules) the radio resource for transmitting the user data, from the first radio resource. The UE 100-1D transmits the control signal including the SA indicating the determined radio resource by using the second radio resource.

On the other hand, in step S117-2 in the above-described first embodiment, the cell 2 (eNB 200-2) is capable of transmitting, as the assigned radio resource, the above-described second radio resource. The UE 100-2D is capable of receiving the control signal including the SA from the UE 100-1D in accordance with the second radio resource.

Thereafter, in step S118, the UE 100-1D uses the determined radio resource to perform the transmission of the user data. The UE 100-2D receives the user data from the UE 100-1D in accordance with the SA included in the control signal from the UE 100-1D. Thus, the cell 1 and the cell 2 are capable of controlling, in cooperation with each other, the D2D communication of the UE 100-1D and the UE 100-2D.

Further, in each of the above-described embodiments, the eNB 200-1 notifies the eNB 200-2 of the scheduling information; however, this is not liming. The eNB 200-2 may notify the eNB 200-1 of the scheduling information and the eNB 200-1 (cell 1) and the eNB 200-2 (cell 2) may share the scheduling information.

Further, in each of the aforementioned embodiments, the direct communication mode in the D2D communication is mainly assumed. However, instead of the direct communication mode, the locally routed mode may also be applied.

Each of the aforementioned embodiments has described an example in which the present invention is applied to the LTE system. However, the present invention may also be applied to systems other than the LTE system, as well as the LTE system.

In addition, the entire content of U.S. Provisional Application No. 61/766,528 (filed on Feb. 19, 2013) is incorporated in the present specification by reference.

INDUSTRIAL APPLICABILITY

As described above, the communication control method, the user terminal, and the base station according to the present invention are able to make it is possible that a plurality of cells can control D2D communication in cooperation with one another, and thus they are useful for a mobile communication field.

The invention claimed is:

1. A communication control method that is used in a mobile communication system that supports D2D communication that is direct device-to-device communication in which a data path does not pass through a core network, comprising:
  a step A of transmitting, by a first user terminal camping on a first cell, a radio signal that includes a serving cell identifier for identifying the first cell;
  a step B of transmitting, by a second user terminal camping on a second cell, the serving cell identifier included in the radio signal transmitted from the first user terminal to the second cell when the radio signal is received from the first user terminal;
  a step C of sharing, by the first cell and the second cell, scheduling information for controlling the D2D communication performed by the first user terminal and the second user terminal, on the basis of the serving cell identifier received by the second cell from the second user terminal; and
  a step D of controlling, by the first cell and the second cell in cooperation with each other, the D2D communication performed by the first user terminal and the second user terminal, on the basis of the shared scheduling information, wherein
  one user terminal of the first user terminal and the second user terminal is an anchor terminal, which is able to control the other user terminal in the D2D communication,
  in the step D, the first cell or the second cell transmits control information of the D2D communication to the one user terminal that is the anchor terminal,
  the step D comprises:
  a step of inquiring, by the one user terminal that is the anchor terminal, of a serving cell of the one user terminal between the first cell and the second cell regarding whether the scheduling information decided by the one user terminal is applicable; and
  a step of sharing, by the first cell and the second cell, the scheduling information on the basis of the inquiry from the one user terminal that is the anchor terminal.

2. The communication control method according to claim 1, wherein
  The radio signal is a discovery-use signal for the discovery of a proximal terminal that can be a communication partner of the D2D communication.

3. The communication control method according to claim 1, wherein
  the scheduling information includes information on a radio resource that is assigned for the D2D communication that is performed by the first user terminal and the second user terminal.

4. The communication control method according to claim 1, wherein
  the scheduling information includes information on a radio resource assigned for the D2D communication in at least one of the first cell and the second cell.

5. The communication control method according to claim 4, wherein
  the radio resource assigned for the D2D communication is a radio resource capable of being used for receiving a D2D communication signal in the D2D communication.

6. The communication control method according to claim 4, wherein
  the radio resource assigned for the D2D communication is a radio resource capable of being used for transmitting a D2D communication signal in the D2D communication.

7. The communication control method according to claim 6, wherein
  the radio resource capable of being used for transmitting the D2D communication signal is within a range of a radio resource capable of being used for receiving the D2D communication signal in at least one of the first cell and the second cell.

8. The communication control method according to claim 4, wherein
the radio resource assigned for the D2D communication is a radio resource capable of being used for exchanging a control signal including information indicating a radio resource used for exchanging user data in the D2D communication.

9. The communication control method according to claim 1, wherein
the first cell is managed by a first base station and the second cell is managed by a second base station, and
in the step C, one of the first base station and the second base station transmits the scheduling information to the other base station to thereby share the scheduling information between the first cell and the second cell.

10. A base station, which manages a second cell in a mobile communication system that supports D2D communication that is direct device-to-device communication in which a data path does not pass through a core network, comprising:
a receiver configured to receive a serving cell identifier for identifying a first cell on which a first user terminal camps, from a second user terminal camping on the second cell; and
a controller configured to share scheduling information for controlling the D2D communication performed by the first user terminal and the second user terminal, with another base station that manages the first cell, on the basis of the serving cell identifier received by the receiver, wherein,
in cooperation with the another base station, the controller controls the D2D communication performed by the first user terminal and the second user terminal, on the basis of the shared scheduling information,
the second user terminal is an anchor terminal which is able to control the first user terminal in the D2D communication,
the transmitter transmits control information of the D2D communication to the second user terminal,
in controlling the D2D communication,
the receiver receives an inquiry from the second user terminal regarding whether the scheduling information decided by the second user terminal is applicable, and
the controller shares the scheduling information on the basis of the inquiry from the second user terminal that is the anchor terminal.

11. The base station according to claim 10, wherein
the scheduling information includes information on a radio resource assigned for the D2D communication in at least one of the first cell and the second cell.

12. The base station according to claim 11, wherein
the radio resource is a radio resource capable of being used for receiving a D2D communication signal in the D2D communication.

13. The base station according to claim 11, wherein
the radio resource is a radio resource capable of being used for transmitting a D2D communication signal in the D2D communication.

14. The base station according to claim 13, wherein
the radio resource capable of being used for transmitting the D2D communication signal is within a range of a radio resource capable of being used for receiving the D2D communication signal in at least one of the first cell and the second cell.

15. The base station according to claim 11, wherein
the radio resource assigned for the D2D communication is a radio resource capable of being used for exchanging a control signal including information indicating a radio resource used for exchanging user data in the D2D communication.

\* \* \* \* \*